Sept. 25, 1956  H. PAUL ET AL  2,764,178
AUTOMATIC CONTROL OF LIQUID LEVELS IN VESSELS
Filed Sept. 19, 1951
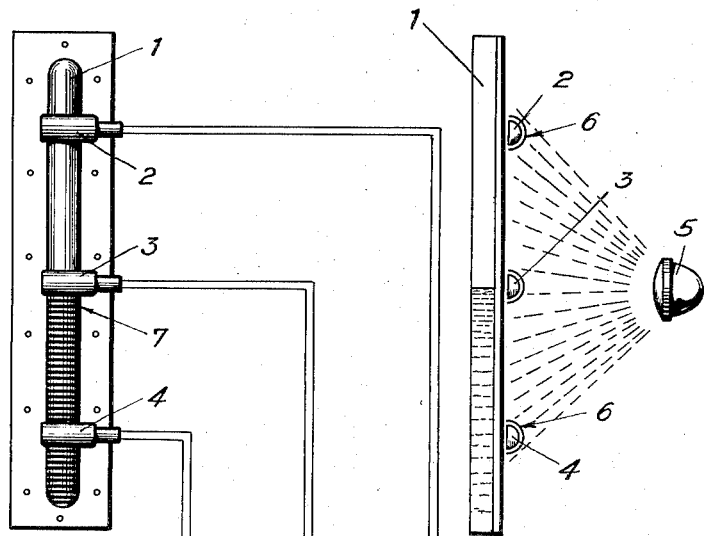
FIG. 1   FIG. 2
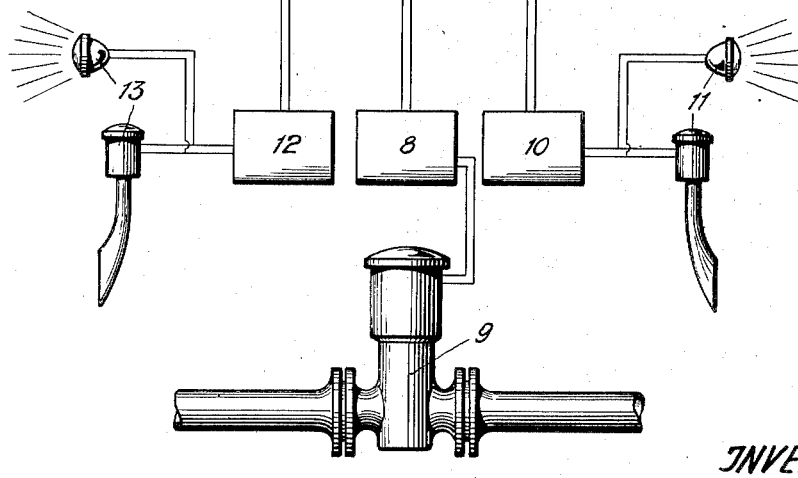
INVENTORS
Herbert Paul
Theodor vander List
BY Burgess & Dinklage
ATTORNEYS

United States Patent Office 2,764,178
Patented Sept. 25, 1956

2,764,178

AUTOMATIC CONTROL OF LIQUID LEVELS IN VESSELS

Herbert Paul and Theodor van der List, Oberhausen-Holten, Germany, assignors to Ruhrchemie Aktiengesellschaft, Oberhausen-Holten, Germany, a corporation of Germany Application September 19, 1951, Serial No. 247,206

5 Claims. (Cl. 137—412)

This invention relates to improvements in the automatic control of the liquid levels in vessels. It more particularly relates to an apparatus for controlling liquid levels in high pressure vessels.

Steam boilers and many other liquid or reaction vessels require the exact maintenance of a definite liquid level during their operation. Devices are known and in operation for automatically maintaining the liquid level in such vessels at the required height. These devices usually contain an element in contact with the liquid level within the vessel by mechanical or electrical means and send corresponding impulses to a valve which controls the admission of the liquid. These conventional control devices have the disadvantage that the measuring members situated within the vessel are exposed to deleterious influence, as, for example, high pressure, high temperatures, corrosive vapors or liquids. Furthermore, a great deal of difficulty is associated with effecting the transmission of the impulses from the measuring members through the walls of the container, especially in the case of high pressure vessels having in part very thick walls.

One object of this invention is the automatic control of the liquid levels in these type of vessels without the aforementioned difficulties. This, and still further objects, will be apparent from the following description read in conjunction with the drawings.

It has now been found that the liquid levels in containers or vessels may be controlled very simply and reliably in the following manner: The vessel or container, the liquid level in which it is to be controlled, is provided with a liquid level gauge glass. One or more photoelectric cells are arranged on the outside of this liquid level gauge glass and the glass is illuminated with a source of illumination. The source of illumination is positioned so that the light rays from it either pass through the level gauge glass into the photoelectric cells or are diffused from the gauge glass into the photoelectric cells. The intensity of the illumination so transmitted or diffused from the gauge glass into the photoelectric cells will change depending on whether or not there is liquid in the gauge glass at the point at which the light is either diffused or transmitted to the photoelectric cell. The photoelectric cell must be sensitive enough to indicate this change in intensity of illumination. The photoelectric cell is connected, suitably through amplifying means to a motor which will open or close a valve for the liquid admission into the vessel depending upon the indications transmitted from the photoelectric cell.

The structure of the liquid level gauge glass in accordance with the invention may be that of any known or conventionally used gauge glass. The photoelectric cell may have the construction of any known photoelectric cell with the required sensitivity, and the amplifying means for amplifying the indications are also of known construction.

The light transmitted through or diffused from the gauge glass at any given point from any given source of illumination will be of lesser intensity if that given portion of the gauge glass contains liquid than if it contains vapor or gas. It thus follows that a photoelectric cell positioned at any point of the gauge glass will generate a smaller electro-motive force if that portion of the gauge glass contains liquid than if it contained vapor or gaseous agent. For example, if a photoelectric cell positioned at a particular point on the gauge glass and light from a source of illumination is either transmitted through the gauge glass into the photoelectric cell or diffused from the gauge glass into the photoelectric cell, the electro-motive force generated by the cell will be relatively small when that portion of the glass is filled with liquid and will considerably increase when the liquid level falls below this point and the gauge glass merely contains glass or vapor at this point. The electro-motive force generated by the photoelectric cell is a function of the intensity of the illumination at the cell and of the area illuminated. By known amplifying means, as for example, through vacuum tube circuits, the electro-motive forces may be increased in any desired manner and utilized for the actuation of switching members, warning devices, remote level indicators and regulating valves.

The instant invention has many and varied applications. For example, a photoelectric cell may be positioned in the vicinity of the normal liquid level in the gauge glass in such a manner that it lies in part opposite the zone of the gauge glass containing liquid, and in part opposite the zone contacted by the vapor. Under normal conditions with the liquid level at its normal height a certain constant quantity of light will be diffused from the gauge glass to the photoelectric cell. The photoelectric cell thus receiving this constant quantity of diffused light would produce an electromotive force to which the amplifier is adjusted so that it will not cause any change in the normal admission of liquid to the vessel. If the liquid level drops, the photoelectric cell will be subjected to illumination of greater intensity, inasmuch as the portion of the gauge glass which is contacted by vapor is increased. This will bring about an increase in the electro-motive force generated by the photo-electric cells which after amplification through the amplification means actuates a motor in order to further open the liquid admission valve. For an increase of the liquid level, the intensity of the light which strikes the photoelectric cell and thus the electro-motive force generated thereby will be decreased conversely by the increase of the area of the gauge glass which is contacted by the liquid. This decrease in the electro-motive force transmitted through the amplifying means is utilized to close the liquid admission valve. By the alternating actuation of the closing and opening motions, the normal liquid level can be maintained with a high degree of precision and without any great time lag.

In a similar manner it is also possible to control the highest and lowest permissible liquid levels in the vessel. In the vicinity of the highest and/or the lowest permissible liquid levels on the gauge glass there are positioned separate photoelectric cells which receive light diffused from or transmitted through the gauge glass. When the highest permissible liquid level is exceeded, the photoelectric cell positioned at this level will respond with a decrease in the electro-motive force generated thereby inasmuch as it receives considerably less light than the amount corresponding to normal conditions with no liquid in the gauge glass at this point. Upon reaching the lowest level the photoelectric cell arranged there, increases its amount of generated electro-motive force as the intensity of the light striking it is greater than under normal conditions. These variations in the electromotive force produced at the maximum or minimum liquid levels may be used to actuate any warning devices such as visual or audible warning apparatuses.

The electro-motive forces produced in accordance with the invention as a function of the alternating liquid level by means of photoelectric cells can be transmitted in any known manner to electric remote-indicating apparatuses.

The liquid level and its change may also be continuously controlled in accordance with the invention. For this purpose a photoelectric cell is arranged opposite the liquid gauge glass at its normal level. The length of this photoelectric cell corresponds to the permissible change in the liquid level. This photoelectric cell receives a greater or smaller quantity of light transmitted through or diffused from the gauge glass depending upon the height of the liquid level inasmuch as the size of the area of the photoelectric cell receiving this illumination through or from the areas containing and not containing liquid varies. The electro-motive force generated by the photoelectric cell will change with changes in the liquid level. These changes may be amplified and transmitted through known devices to a continuous indicating apparatus.

The liquid level measurement and control in accordance with the invention is highly dependable, provided a constant source of illumination is provided. If this source of illumination fails or its intensity changes substantially, the liquid levels will cease to be controlled with any degree of certainty. The photoelectric cell used in accordance with the invention may be connected to an alarm signal for automatic actuation thereof if the source of illumination fails or if the liquid level glass becomes very dirty. Variations in the intensity of the illumination of the source of light which is transmitted or diffused by the sight glass to the photoelectric cell can be compensated by means of an additional photoelectric cell placed opposite the source of illumination and which has amplifying means connected therewith for transmitting any variations in the electro-motive force produced by variations in the intensity of the source of illumination.

In the drawing there is shown by way of example one device which is suitable for the carrying out of the present invention. There is shown in this connection a liquid level sight glass which is illuminated from the outside and which indicates the liquid level by reflected light. In principle, the same arrangement also applies to transilluminated liquid level sight glasses, with the only difference being that the source of light is arranged on the opposite side of the photo-electric cells.

In the drawing, Fig. 1 shows a front elevation of an embodiment of an automatic control apparatus in accordance with the invention; and, Fig. 2 shows a side elevation of the liquid level gauge glass and the photoelectric cells shown in Fig. 1, also showing the source of illumination.

1 is the liquid level sight glass (Fig. 1), for instance, the water level glass of a high pressure steam boiler. In front of this level glass there are arranged at different heights three photoelectric cells—2, 3 and 4. The liquid level gauge glass 1 is illuminated from the outside by a strong source of light 5 (Fig. 2). In order to keep direct light out, the photoelectric cells are covered with protective screens 6 in such a manner that they only receive light which has been diffused by the glass. The central photoelectric cell 3 is arranged near the normal liquid level 7 and receives diffused light both from the lower dark zone and from the upper bright zone of the level glass 1. This photoelectric cell 3 is connected with a tube amplifier 8 which further opens or closes the liquid admission valve 9 by the use of an auxiliary current. As soon as the liquid level exceeds the normal height, valve 9 begins its closing motion, due to the reduced light diffused into the photoelectric cell and due to the reduced electromotive force generated by this cell. In case of an increase in the light reflected into the photocell 3, i. e., upon a sinking of the liquid 7, the electromotive force generated by the photoelectric cell is increased. This increase is transmitted to the amplifying device 8 which causes the opening motion of valve 9, so that the liquid level again rises. By alternating closing and opening motions, the photoelectric cell 3, arranged in the vicinity of the normal liquid level, adjusts the liquid level to a constant normal height, despite any changes in load occurring in the steam boiler.

The photoelectric cell 2 is set at the maximum permissible liquid level. As soon as it receives a reduced amount of light, it places an acoustic or visual warning signal 11 in operation via the amplifying device 10. In a similar manner, the minimum permissible liquid level is controlled by the photoelectric cell 4 which actuates an acoustic or visual warning signal 13 in case of increased radiation by means of the amplification device 12.

The photoelectric cells 2, 3 and 4 can extend over the entire width of the gauge glass 1, as shown in Fig. 1. These photoelectric cells, however, can also be permitted to extend only about over one-half width of the sight glass so as not to prevent a direct observation of the sight glass.

Though the control of the admission valve into the container or vessel is described, it is, of course also possible in the same manner to control a valve in the discharge line from the container or vessel.

We claim:

1. In an apparatus having a source of illumination and a photo-electric cell operating in conjunction with a liquid-level sight glass of a closed container for controlling the liquid level in the container through valve means, the improvement which comprises the source of illumination positioned in front of said sight glass for the direct illumination thereof, the photo-electric cell positioned in front of said sight glass adjacent thereto between said sight glass and said source of illumination for receiving diffused light from said sight glass originating at said source of illumination, and shielding means positioned for shielding said photo-electric cell from direct illumination from said source of illumination.

2. Improvement according to claim 1, in which said photo-electric cell is positioned at the normal liquid level in said sight glass for the actuation of a valve-controlled liquid-admission line, whereby an increase in the intensity of light striking said photo-electric cell causes opening actuation of said liquid-admission line and a decrease in the intensity of light striking said photo-electric cell causes closing actuation of said liquid-admission line.

3. Improvement according to claim 1, including at least one additional photo-electric cell positioned outside said sight glass adjacent thereto between said sight glass and said source of illumination at the maximum permissible liquid level of said sight glass for receiving diffused light from said sight glass originating at said source of illumination, additional shielding means positioned for shielding said additional photo-electric cell from direct illumination from said source of illumination, and a warning signal controlled by said additional photo-electric cell for warning actuation upon a decrease in the intensity of reflected light striking said additional photo-electric cell.

4. Improvement according to claim 1, including at least one additional photo-electric cell positioned outside said sight glass adjacent thereto between said sight glass and said source of illumination at the minimum permissible liquid level of said sight glass for receiving reflected light from said sight glass originating at said source of illumination, additional shielding means positioned for shielding said additional photo-electric cell from direct illumination from said source of illumination, and a warning signal controlled by said additional photo-electric cell for warning actuation upon an increase of the intensity of diffused light striking said additional photo-electric cell.

5. Improvement according to claim 1, in which said photo-electric cell is positioned at the normal liquid level of said sight glass, said photo-electric cell having an active length equal to the length of permissible liquid level variations in said sight glass.

References Cited in the file of this patent

UNITED STATES PATENTS

| | | |
|---|---|---|
| 1,455,795 | Logan | May 22, 1923 |
| 1,678,884 | Sweet | July 31, 1928 |
| 1,924,139 | Thomas | Aug. 29, 1933 |
| 2,070,617 | Offut | Feb. 16, 1937 |
| 2,091,303 | Brelsford | Aug. 31, 1937 |
| 2,149,735 | Henderson | Mar. 7, 1939 |
| 2,358,103 | Ryder | Sept. 12, 1944 |
| 2,490,627 | Hofberg | Dec. 6, 1949 |
| 2,654,858 | Feller | Oct. 6, 1952 |

FOREIGN PATENTS

| | | |
|---|---|---|
| 27,973 | Great Britain | of 1908 |